United States Patent [19]

Bäckström

[11] 3,925,992

[45] Dec. 16, 1975

[54] METHOD AND RESERVOIR FOR STORING NUCLEAR RESIDUES

[75] Inventor: Arne L. Bäckström, Stockholm, Sweden

[73] Assignee: Svenska Entreprenad AB Sentab, Stockholm, Sweden

[22] Filed: June 13, 1974

[21] Appl. No.: 479,063

[30] Foreign Application Priority Data
June 14, 1973 Sweden .............................. 7308359

[52] U.S. Cl. .......................... 61/.5; 176/87; 220/18
[51] Int. Cl.² ........................ B65G 5/00; G21F 9/24
[58] Field of Search ............... 61/.5, 50, 35; 220/18, 220/9 LG, 9 A; 176/87

[56] References Cited
UNITED STATES PATENTS
3,759,044  9/1973  Caron ..................................... 61/35

FOREIGN PATENTS OR APPLICATIONS
968,983    5/1950   France ....................................... 61/.5
1,044,399  9/1966   United Kingdom ...................... 61/.5
1,431,277  2/1969   Germany .............................. 220/18

Primary Examiner—Jacob Shapiro
Attorney, Agent, or Firm—Sughrue, Rothwell, Mion, Zinn & Macpeak

[57] ABSTRACT

A method of storing nuclear residues in an underground rockcavity reservoir comprises the steps of surrounding a container for the residues with a low-viscous liquid such as bitumen or BENTONITE having a density somewhat above that of water and a sealing action on cracks in the container and/or the surrounding rock formation, and connecting the container to the walls of the rock cavity by means of resilient or flexible supports only. The invention also refers to a rock-cavity reservoir for such storage.

12 Claims, 3 Drawing Figures

METHOD AND RESERVOIR FOR STORING NUCLEAR RESIDUES

This invention refers to a method of storing nuclear residues in an underground rock-cavity reservoir and a reservoir for practicing the method.

Different proposals have heretofore been made for long-time storing of nuclear residues such as storing in unlined rock-cavities at very large depths below the ground surface. The cavities are created by conventional blasting or by detonation of nuclear charges. There has then been held to exist the risk that these rock-cavities can never be made completely gas- or watertight which means that for instance ground water movements — even at low speed — might lead to distribution of radioactively contaminated ground water to adjacent areas.

Also, there has been proposed to store the residues in rock-cavities lined with concrete on moderate depths. However, it has been objected that during the long critical storing period the rigid construction might get hurt by movements in adjacent rock formations created by for instance blasting or earth cracks and leading to leakage from the storing facility.

The present invention avoids the abovementioned drawbacks substantially by surrounding a container for the residues with a high viscous liquid having a density somewhat above that of water and a sealing effect on cracks in the container and/or the surrounding rock formation, and connecting the container to the walls of the rock-cavity by means of resilient or flexible support means only.

Further aspects of the invention will become evident from the following description of some embodiments thereof, wherein reference is made to the accompanying schematic drawings.

Figure 1:
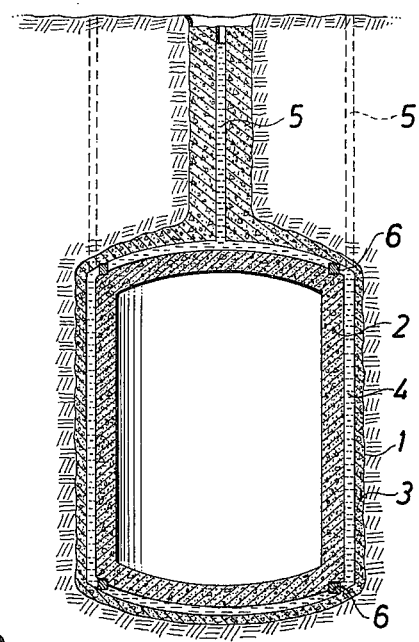
FIG. 1 shows a rock-cavity reservoir for storing nuclear residues.

In a rock cavity 1 there is constructed such as by casting of concrete a cylindrical container 2 having a dome-shaped roof and bottom. The container is separated from the walls of the cavity possibly having an applied concrete strengthening layer 3 by means of a cleft 4 filled with a high viscous liquid of a somewhat higher density than water. The liquid level can be controlled and if necessary adjusted by means of pipes 5 leading to the ground surface. An empty or only partly filled container tends to float in the liquid. At a certain filling-degree this will, however, not be the case. Therefore, along the periphery of the top and bottom of the container there is provided a number of resilient supports 6 which connect to the roof and bottom, respectively, of the rock cavity.

This arrangement will eliminate or reduce to acceptable level undesired action on the container due to movements in the rock formation such as by chocks from outer detonations, earth cracks and the like.

If the liquid is a suitably chosen bitumen or a clay-suspension of a density somewhat greater than that of water, a good self-sealing effect on possible cracks in the surrounding rock formation or in the container proper will be obtained. Further, every type of contact with ground water in the rock formation will be avoided.

The surrounding liquid will also due to its hydrostatic pressure on the container — if it is made of concrete — provide for additional safety against formation of cracks therein and, thus, accomplish tightness of the container during a long period of working life.

Figure 2:
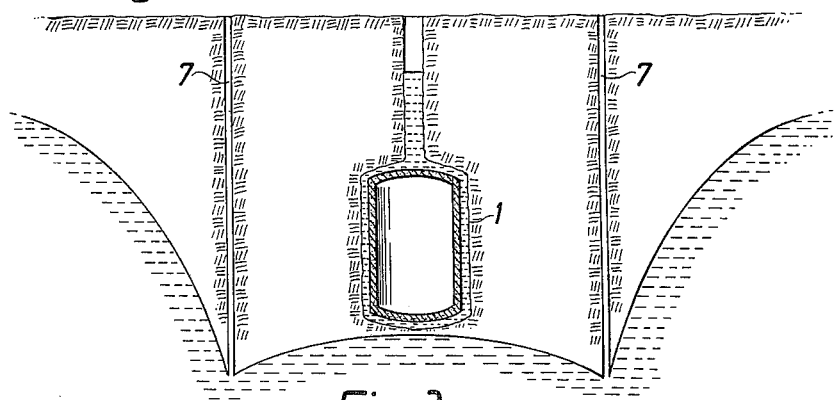
FIG. 2 illustrates a reservoir according to FIG. 1 a number of holes for drying the rock formation being drilled in the region of the reservoir.
Figure 3:
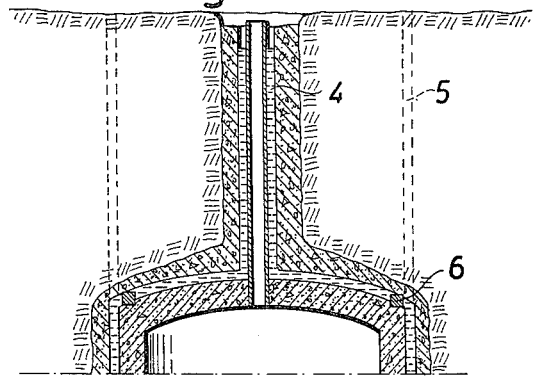
FIG. 3 illustrates the upper portion of a somewhat modified reservoir allowing entrance to the liquid-surrounded container.

If leakage of groundwater into the rock-cavity during the construction of the reservoir is deemed to be embarrassing, a number of holes 7, FIG. 2, can be drilled and be used for pumping and thereby drying the rock formation. The drilling holes 7 can also during the storing period be used for testing by means of pumping that the groundwater is not contaminated.

Alternatively, it might be convenient by means of pumping to keep the groundwater permanently away from the rock cavity or to choose such a place for the container that groundwater is not present at all.

The liquid shall then have such viscosity that leakage into the surrounding cavity will be little or none at all.

If the container 2 is being made of concrete, upon completion of the bottom the known sliding-form casting-technique can be used. At casting of the container walls the cleft 4 can be accomplished simultaneously with casting of the strengthening lining 3. The mould for the container roof can follow together with the sliding-form. It can be of advantage continuously to supply the high viscous liquid to the cleft 4 with certain slip relative to the slideform casting. Then the forces on the underlying resilient supports 6 can be reduced. However, the liquid must not be permitted to reach such a level that the lifting force is greater than the weight of the container. Complete filling of the space or cleft 4 must therefore wait until the construction has been completed.

Certain additional equipment for supplying residues to the container, inspection (such as by TV), control etc. has not been shown. However, such equipment at hand on the market can be used in the present context also.

The container can in its illustrated design be used for low and middle-active residues. At storing of high-active residues the container must be completed by an internal protection layer and means for heat-insulation and cooling. The storing-principle can be applied for long-time-storing of other than radioactive products.

A container filled with residues can — if the characteristics of the stored product so permit — be sealed by bitumen or other cheap resistant filling material and then be abandoned.

What I claim is:

1. A rock-cavity reservoir, especially for storing radioactive residues comprising:
   a. a container disposed within an underground rock-cavity;
   b. resilient means connecting top and bottom walls of the container to the walls of the rock-cavity such that the container is spaced from the walls of the rock-cavity; and
   c. a liquid having a higher density than water disposed within the space between the rock-cavity walls and said container, said liquid having a sealing action on the walls of the rock-cavity and the container.

2. A rock-cavity reservoir as claimed in claim 1 wherein said liquid is a high-viscosity liquid.

3. A rock-cavity reservoir as claimed in claim 1, wherein said liquid is bitumen.

4. A rock-cavity reservoir as claimed in claim 1, wherein said liquid is a clay-suspension such as BENTONITE.

5. A method of storing nuclear residues in an underground rock-cavity reservoir comprising the steps of:
   a. storing the nuclear residues in a closed container;
   b. placing the container in an underground rock-cavity;
   c. supporting the container within the underground rock-cavity such that the container is spaced from the walls of the rock-cavity; and
   d. placing a liquid having a density higher than water in the space between the container and the rock-cavity, said liquid having a sealing effect on the container and the rock-cavity.

6. A method of claim 5 wherein a high viscosity liquid is placed between the container and the rock-cavity.

7. A method as claimed in claim 5 and surrounding the container by a bitumen mixture of suitable composition.

8. A method as claimed in claim 5, and surrounding the container by a water-suspended additional substance which has a sealing action on cracks.

9. A method as claimed in claim 8, wherein said additional substance is a clay suspension such as BENTONITE.

10. A method as claimed in claim 5 and drilling holes in the rock formation from the ground surface to the region of the liquid surrounding the container and controlling and adjusting the liquid level by using said holes.

11. A method as claimed in claim 5 and drilling holes around the container, and using said holes temporarily during construction of the reservoir and permanently during storing of the residues for removing ground water from the region of the reservoir by pumping.

12. A method as claimed in claim 5 and applying on the container a protection layer, an insulation and/or a cooling means in dependence of the aggressiveness and other chemical/physical characteristics of the stored product.

* * * * *